United States Patent
Kitashou (10) Patent No.: US 9,082,186 B2
(45) Date of Patent: Jul. 14, 2015

(54) IMAGE PROCESSING APPARATUS AND IMAGE PROCESSING METHOD

(71) Applicant: CANON KABUSHIKI KAISHA, Tokyo (JP)

(72) Inventor: Tetsurou Kitashou, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 262 days.

(21) Appl. No.: 13/858,298

(22) Filed: Apr. 8, 2013

(65) Prior Publication Data

US 2013/0271494 A1    Oct. 17, 2013

(30) Foreign Application Priority Data

Apr. 17, 2012    (JP) .................................. 2012-094178

(51) Int. Cl.
  G09G 5/00    (2006.01)
  G06T 5/00    (2006.01)
  H04N 9/31    (2006.01)

(52) U.S. Cl.
  CPC .............. *G06T 5/006* (2013.01); *H04N 9/3185* (2013.01)

(58) Field of Classification Search
  None
  See application file for complete search history.

(56) References Cited

U.S. PATENT DOCUMENTS

| | | | |
|---|---|---|---|
| 2009/0027629 A1* | 1/2009 | Yonezawa | ........................ 353/70 |
| 2010/0165168 A1 | 7/2010 | Takahashi | |
| 2012/0008101 A1 | 1/2012 | Oka | |

FOREIGN PATENT DOCUMENTS

| | | |
|---|---|---|
| CN | 1760716 A | 4/2006 |
| CN | 101963742 A | 2/2011 |
| JP | 3735158 B | 1/2006 |
| JP | 2008-312099 A | 12/2008 |

OTHER PUBLICATIONS

Chinese Office Action issued in corresponding application No. 201310130840.5 on Mar. 30, 2015.

* cited by examiner

*Primary Examiner* — Phi Hoang
*Assistant Examiner* — Mohammad H Akhavannik
(74) *Attorney, Agent, or Firm* — Carter, DeLuca, Farrell & Schmidt, LLP (57) ABSTRACT

The distance between projection coordinates to which the center of an image are projected and the center coordinates are added to the projection coordinates to obtain projection center coordinates. The distance is added to the coordinates to which the four corners of the image are projected to obtain projection four-corner coordinates. A distance shorter than the minimum of the distances between the projection four-corner coordinates and the projection center coordinates is decided as an output margin distance. Projection source coordinates to be projected to coordinates apart from the projection center coordinates by the output margin distance are obtained. A maximum of the distances between the projection source coordinates and the projection center coordinates is decided as an input margin distance. Divided images decided based on ½ of horizontal size of the image and the input margin distance are deformed and outputted.

4 Claims, 7 Drawing Sheets

IMAGE PROCESSING APPARATUS AND IMAGE PROCESSING METHOD

FIELD OF THE INVENTION

The present invention relates to an image processing technique including image deformation processing.

DESCRIPTION OF THE RELATED ART

In a product such as a projector, when light output from the projector is projected on a screen, the effective region projected on the screen is distorted into a trapezoidal shape due to the installation tilt angle of the projector, an optical lens shift, and the like. It is difficult for the user to view the image without eliminating the trapezoid distortion. Hence, image deformation processing of deforming the effective region into an inverted trapezoidal shape is generally performed so that the effective region projected on the screen obtains a rectangular shape. This image deformation processing is known as, for example, keystone distortion correction processing or keystone correction processing.

The resolutions of videos are rising in recent years, and a higher-resolution video needs to be processed by the above-described image deformation processing. However, an image deformation processing apparatus normally has an upper limit to the processable resolution and may be unable to process a required resolution on a standalone basis. The above-described upper limit of the processable resolution is decided by processing throughput attributed to the operating frequency of the image deformation processing apparatus, the horizontal-direction size of the line buffer of an internal buffer included as a constituent element, or the transfer band of the DRAM of a frame memory included as a constituent element.

To solve the above-described problem, related arts have been proposed by, for example, patent literature 1 (Japanese Patent Laid-Open No. 2008-312099) and patent literature 2 (Japanese Patent No. 3735158). In these methods, an input video having a high resolution is cut out to a plurality of images, and a plurality of image deformation processing apparatuses process the respective images, thereby solving the above-described problem.

More specifically, in the method described in patent literature 1, the apparatus includes a plurality of image cutout units that cut out divided images from an original image within the range in which no pixel losses occur at the boundaries of the divided images synthesized on the projector. The apparatus also includes a plurality of image deformation units that deform and correct the divided images cut out by the plurality of image cutout units in accordance with the three-dimensional shape of the projection plane so as not to distort the projected image, and output the images to the projector. Note that only characteristic elements have selectively been described here for the sake of simplicity.

The system described in patent literature 2 is an image projection system that arranges projection images from a plurality of projectors while making them overlap each other and displays one high-resolution image corresponding to input high-resolution image data on the screen. This system includes an image capture unit that captures a reference image projected on the screen by inputting reference image data to each projector. The system refers to parameters concerning the position of the projection region of each projector on the screen, which are calculated and stored based on the reference image capture data obtained by the image capture unit. The system also includes an image processing unit that cuts out, from the high-resolution image data, an image region corresponding to the position of each projection region based on the referred parameters and outputs the image to each projector.

As described above, both the related arts of patent literatures 1 and 2 implement distribution of processing and solve the above-described problem.

In the image deformation processing, the size of the effective region of an image changes between input and output. For this reason, in the image deformation apparatus including the plurality of image deformation units, it may be necessary to make the input image size larger than the output image size in the individual image deformation units.

Figure 1:
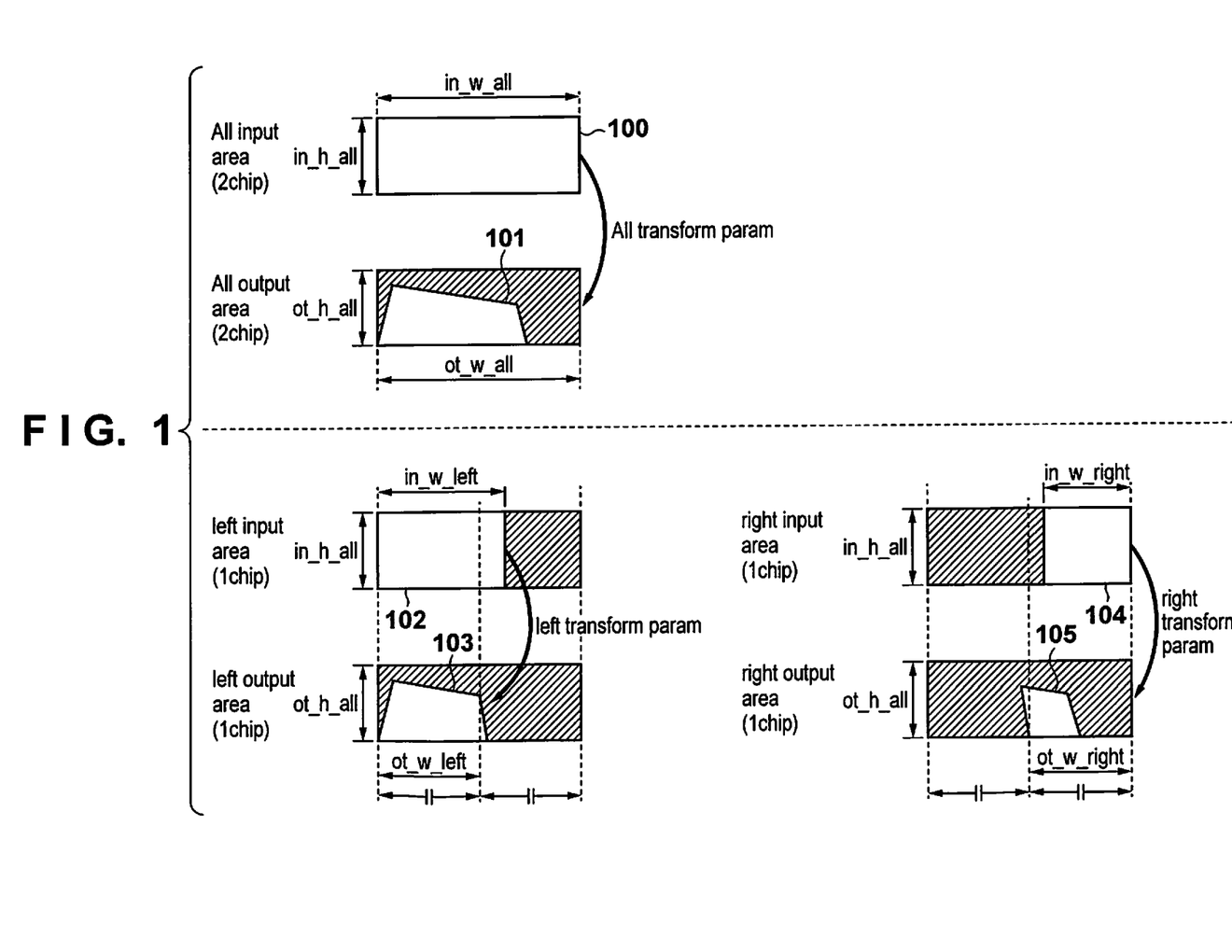
FIG. 1 is a view showing an example of image deformation.

FIG. 1 shows this state. In FIG. 1, the left area of an input image (All input area) 100 having a horizontal size in_w_all (ot_w_all) and a vertical size in_h_all (ot_h_all) is deformed by a left image deformation unit, and the right area is deformed by a right image deformation unit. As a result, an output image (All output area) 101 is obtained by deforming the input image 100.

In keystone distortion correction processing of a projector product, the deformed shape of the output image 101 is decided by parameters such as the projection distance from the projector to the screen, the vertical/horizontal installation angles, and the vertical/horizontal lens shifts.

The respective image deformation units have the same horizontal output size ot_w_left=ot_w_right=(ot_w_all/2). The image deformation units also have the same vertical input and output sizes in_h_all=ot_h_all.

The left image deformation unit will be described in particular. To output the horizontal output size ot_w_left, the image deformation unit needs to output a trapezoid area 103 indicated by the white area in the left output area. Since the trapezoid area 103 corresponds to a rectangle area 102 indicated by the white area in the left input area, a horizontal input size in_w_left (>in_w_right) necessary for the image deformation unit can be calculated. This also applies to the right image deformation unit. As a result, the horizontal input sizes in_w_left and in_w_right to be input to the individual image deformation units are known.

The input sizes processable by the individual image deformation units normally have an upper limit. The upper limit is decided by processing throughput attributed to the operating frequency of the image deformation processing apparatus, an internal buffer included as a constituent element (for example, the horizontal-direction size of a line buffer), a frame memory included as a constituent element (for example, the transfer band of a DRAM), or the like.

For this reason, the horizontal input sizes in_w_left and in_w_right to the individual image deformation processes need to be equal to or smaller than the upper limit value of the horizontal input sizes. However, if the effective region of the output image is uneven in the deformation, the horizontal input sizes in_w_left and in_w_right to the individual image deformation units also have unevenness. As a result, the horizontal input sizes exceed the upper limit even if the degree of deformation is small.

Whether the above-described problem can arise in the related arts mentioned in "Description of the Related Art" will be described next. Patent literature 1 describes no method of deciding the effective region of the output image. The description is done by exemplifying a case in which the effective region of the output image has an arbitrary shape. In this method, however, there is no configuration for correcting the position of the effective region of the output image in accordance with the limit of the individual image deformation units. For this reason, the unevenness of the effective region of the output image cannot be averaged. As a result, it can be said that the above-described problem that the horizontal input sizes exceed the upper limit value even if the degree of deformation is small may arise.

Patent literature 2 describes, as the method of deciding the effective region of the output image, a method of deciding the effective region of the output image using, as the reference point, the vertex having the largest angle out of the vertices of the tetragon projected on the screen. More specifically, out of the vertices of a tetragon indicating the maximum range of a projected image represented by "the projected image in FIG. 4(a)" of patent literature 2, "P0" having the largest angle is used as the reference point. However, this method cannot average the unevenness of the effective region of the output image. As a result, it can be said that the above-described problem that the horizontal input sizes exceed the upper limit value even if the degree of deformation is small may arise.

In addition, the input image before division cannot completely be displayed in some cases. More specifically, the lower portion of the left-side image or the upper portion of the right-side image of "the image projected on the screen shown in FIG. 3(d)" of patent literature 2 is not displayed. If this phenomenon occurs, it may be impossible to satisfy the necessary conditions at all.

As described above, in the related arts, the degree of deformation is largely limited because of the unevenness of the effective region of the output image.

SUMMARY OF THE INVENTION

The present invention has been made in consideration of the above-described problems, and provides a technique of, when dividing an input rectangle image and causing a plurality of image deformation units to deform the divided images, averaging the horizontal sizes of the divided images.

According to the first aspect of the present invention, there is provided an image processing apparatus comprising: a unit configured to obtain center coordinates of an input rectangle image; a unit configured to obtain projection coordinates to which the center coordinates are projected when the input rectangle image is deformed using a deformation parameter necessary for deforming a shape of the input rectangle image; a unit configured to obtain a distance between the projection coordinates and the center coordinates in a horizontal direction and obtain, as projection center coordinates, coordinates calculated by adding the obtained distance to the projection coordinates, the horizontal direction being set along one border of the input rectangle image; a unit configured to obtain coordinates to which coordinates of four corners of the input rectangle image are projected when the input rectangle image is deformed using the deformation parameter and obtain, as projection four-corner coordinates, coordinates calculated by adding the distance to the obtained coordinates; a unit configured to obtain distances between the projection four-corner coordinates of the four corners and the projection center coordinates in the horizontal direction and decide, as an output margin distance, a distance shorter than a minimum distance out of the obtained distances; a unit configured to obtain, as projection source coordinates, coordinates of a projection source to be projected to coordinates apart from the projection center coordinates by the output margin distance in the horizontal direction when the input rectangle image is deformed using the deformation parameter; a unit configured to obtain distances between the respective projection source coordinates and the projection center coordinates in the horizontal direction and decide a maximum distance out of the obtained distances as an input margin distance; and an output unit configured to obtain, as a divided image horizontal size, a result obtained by adding the input margin distance to ½ of a size of the input rectangle image in the horizontal direction, and deform a shape of an image in a region whose distance from a left border of the input rectangle image is not more than the divided image horizontal size and a shape of an image in a region whose distance from a right border of the input rectangle image is not more than the divided image horizontal size to output the deformed images.

According to the second aspect of the present invention, there is provided an image processing method performed by an image processing apparatus, comprising: a step of obtaining center coordinates of an input rectangle image; a step of obtaining projection coordinates to which the center coordinates are projected when the input rectangle image is deformed using a deformation parameter necessary for deforming a shape of the input rectangle image; a step of obtaining a distance between the projection coordinates and the center coordinates in a horizontal direction and obtaining, as projection center coordinates, coordinates calculated by adding the obtained distance to the projection coordinates, the horizontal direction being set along one border of the input rectangle image; a step of obtaining coordinates to which coordinates of four corners of the input rectangle image are projected when the input rectangle image is deformed using the deformation parameter and obtaining, as projection four-corner coordinates, coordinates calculated by adding the distance to the obtained coordinates; a step of obtaining distances between the projection four-corner coordinates of the four corners and the projection center coordinates in the horizontal direction and deciding, as an output margin distance, a distance shorter than a minimum distance out of the obtained distances; a step of obtaining, as projection source coordinates, coordinates of a projection source to be projected to coordinates apart from the projection center coordinates by the output margin distance in the horizontal direction when the input rectangle image is deformed using the deformation parameter; a step of obtaining distances between the respective projection source coordinates and the projection center coordinates in the horizontal direction and deciding a maximum distance out of the obtained distances as an input margin distance; and an output step of obtaining, as a divided image horizontal size, a result obtained by adding the input margin distance to ½ of a size of the input rectangle image in the horizontal direction, and deforming a shape of an image in a region whose distance from a left border of the input rectangle image is not more than the divided image horizontal size and a shape of an image in a region whose distance from a right border of the input rectangle image is not more than the divided image horizontal size to output the deformed images.

Further features of the present invention will become apparent from the following description of exemplary embodiments with reference to the attached drawings.

DESCRIPTION OF THE EMBODIMENTS

The embodiment of the present invention will now be described with reference to the accompanying drawings. Note that the embodiment to be described below is an example of detailed implementation of the present invention or a detailed example of the arrangement described in the appended claims.

An image processing apparatus according to the embodiment is an apparatus for deforming an input rectangle image (a still image or the image of each frame of a moving image) and projecting it on a plane such as a screen or an image processing unit incorporated in the apparatus.

Figure 4:
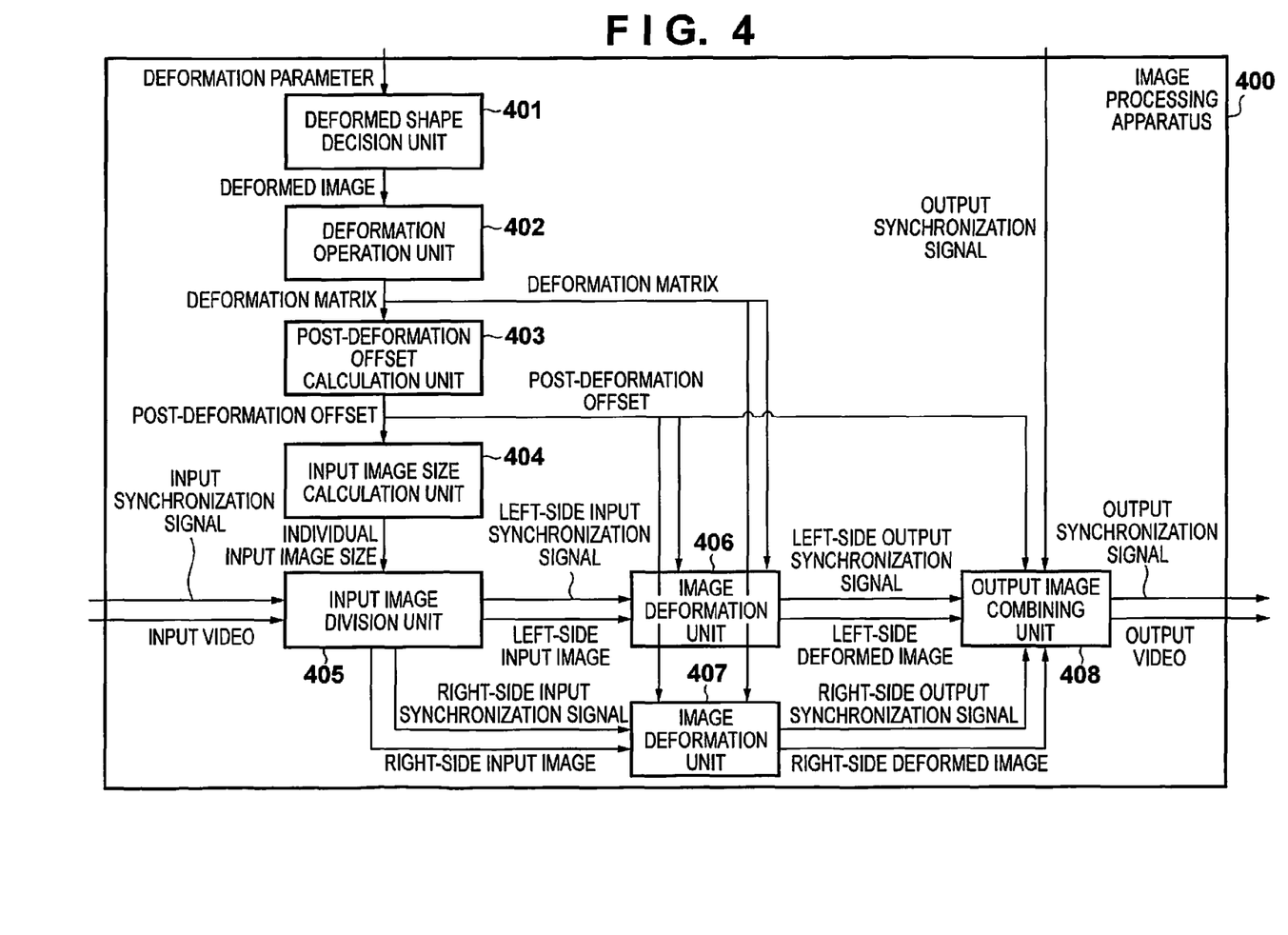
FIG. 4 is a block diagram showing an example of the functional arrangement of an image processing apparatus.

An example of the functional arrangement of the image processing apparatus according to the embodiment will be described with reference to the block diagram of FIG. 4. FIG. 4 shows only major components used to generate a deformed image from an input rectangle image, and components used for image projection or the like are not illustrated.

A deformed shape decision unit 401 obtains, as a deformed shape, coordinates to which the coordinates of the four corners of an input rectangle image are projected when the input rectangle image is deformed using deformation parameters necessary for deforming the shape of the input rectangle image.

The deformation parameters are information to decide the correspondence relationship between an input rectangle image and an output image. For example, in keystone distortion correction processing of a projector product, the information includes parameters such as the projection distance from the projector to the screen, the vertical/horizontal installation angles, and the vertical/horizontal lens shifts.

As for the relationship between the deformation parameters and deformed shape, when the input rectangle image is deformed into a tetragon having a deformed shape represented by four vertices, the projection region on the screen becomes a rectangle under the projector installation condition represented by the deformation parameters.

A deformation operation unit 402 obtains a 3×3 projection matrix (deformation matrix) represented by the deformation parameters using the deformed shape and the coordinates of the four corners of the input rectangle image. This projection matrix is a matrix used to project the coordinates of the four corners of the input rectangle image to the coordinates of the four vertices of the deformed shape. Note that if the deformation parameters are given as the projection matrix in advance, the component for obtaining the projection matrix can be omitted. The following description will be made assuming that projection matrix=deformation parameters.

A post-deformation offset calculation unit 403 obtains the center coordinates of the input rectangle image. The post-deformation offset calculation unit 403 obtains coordinates (projection coordinates) to which the center coordinates are projected when the input rectangle image is deformed using the deformation parameters, and obtains the difference between the obtained coordinates and the center coordinates as "an offset amount used to move the center of the deformed image to the center of the output image".

An input image size calculation unit 404 obtains, based on the offset amount, the size of each of divided images to be obtained by dividing the input rectangle image into two, left and right images, and inputs the obtained sizes to an input image division unit 405.

The input image division unit 405 divides the input rectangle image into two divided images based on the sizes obtained by the input image size calculation unit 404, and inputs one divided image to an image deformation unit 406 and the other divided image to an image deformation unit 407.

The image deformation units 406 and 407 perform deformation processing of the input divided images and output the deformed images to an output image combining unit 408. The output image combining unit 408 combines the deformed images output from the image deformation units 406 and 407 to form one output image. The output image combining unit 408 then moves the image by the post-deformation offset amount and outputs an output synchronization signal and the output image from the apparatus. The offset direction is opposite to the direction in which the post-deformation offset amount to be described later is obtained. The output destination can be either a function unit (for example, projector) for projecting an image or a memory. The image may be output to another device via a network.

Figure 3:
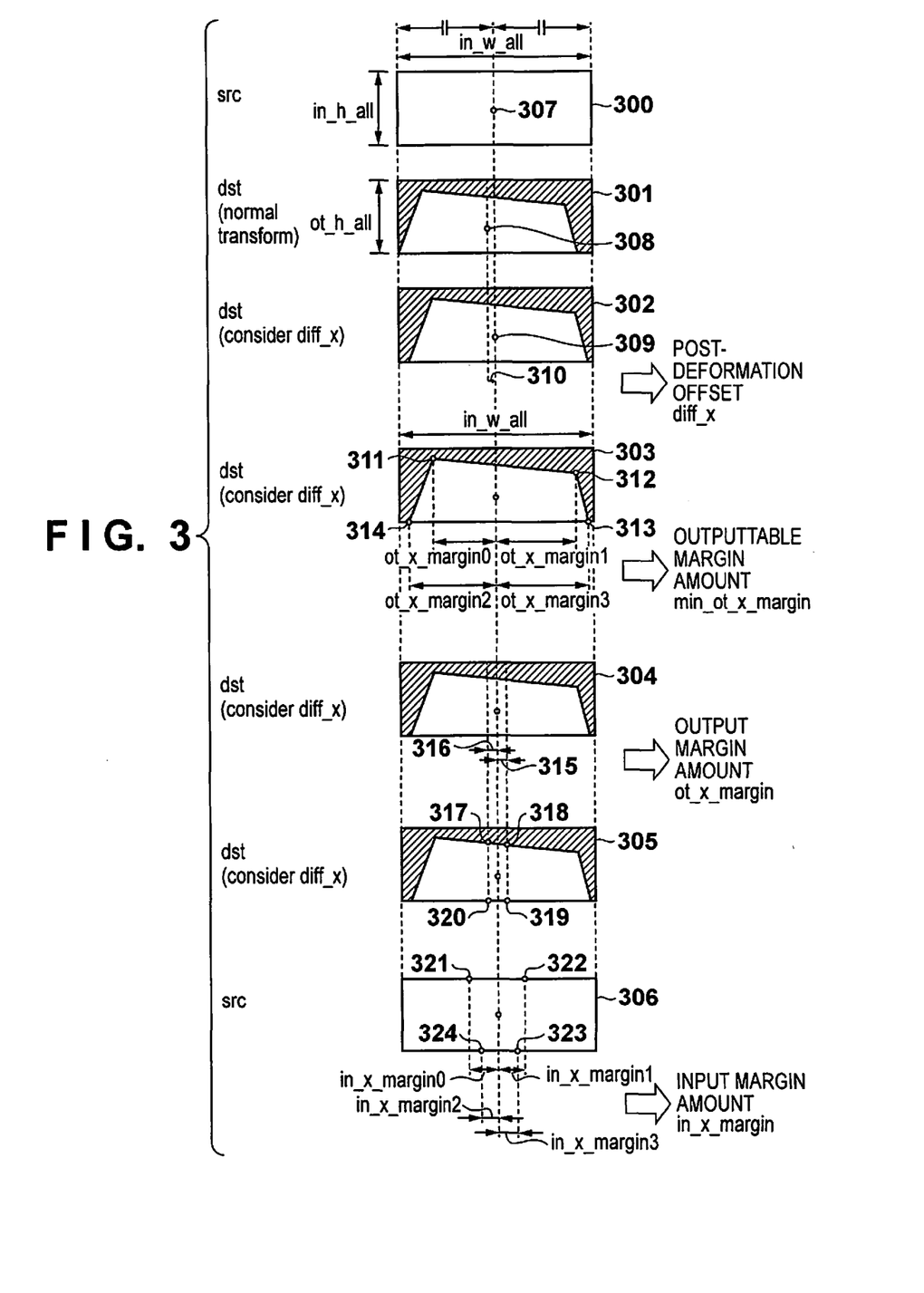
FIG. 3 is a view showing an example of image deformation.
Figure 6:
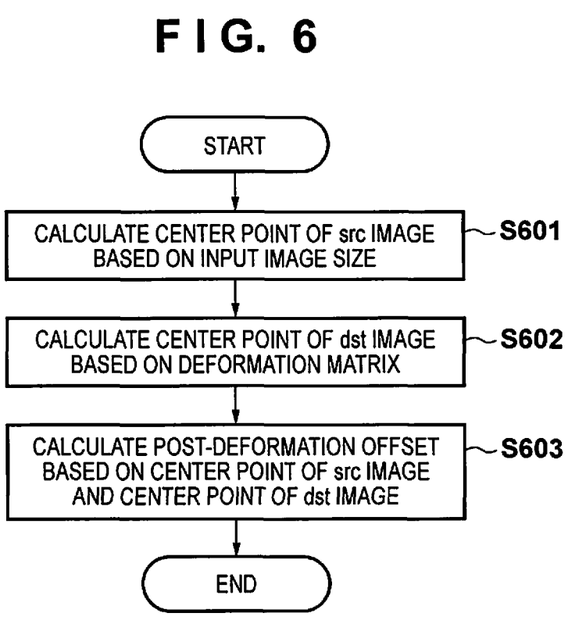
FIG. 6 is a flowchart of processing performed by a post-deformation offset calculation unit 403.

Processing performed by the post-deformation offset calculation unit 403 will be described next with reference to FIG. 6 showing the flowchart of the processing. In step S601, the coordinates (center coordinates) of the center point of the input rectangle image (src image) are obtained. In FIG. 3, an input rectangle image 300 has a horizontal size in_w_all and a vertical size in_h_all. In this case, the coordinates (src_x, src_y) of a center point 307 of the input rectangle image 300 are obtained by $$src\_x = in\_w\_all/2 - 1$$

$$src\_y = in\_h\_all/2 - 1$$

The coordinates of the upper left corner will be defined as (0, 0) in any image hereinafter.

In step S602, coordinates to which the center coordinates are projected when the input rectangle image is deformed using the deformation parameters are obtained. In FIG. 3, the coordinates of a center point 308 of a deformed image 301 (dst image) obtained by deforming the input rectangle image 300 using the deformation parameters are obtained.

More specifically, coordinates DST_POINT (dst_x, dst_y) of the center point 308 of the deformed image 301 corresponding to the center point 307 of the input rectangle image 300 having the center coordinates (src_x, src_y) are obtained by $$S2D\_OFFS\_PRE = \begin{bmatrix} s2d\_offs\_x\_pre \\ s2d\_offs\_y\_pre \\ 0 \end{bmatrix}$$

$$S2D\_OFFS\_PST = \begin{bmatrix} s2d\_offs\_x\_pst \\ s2d\_offs\_y\_pst \\ 0 \end{bmatrix}$$

$$S2D\_MTX = \begin{bmatrix} m00 & m01 & m02 \\ m10 & m11 & m12 \\ m20 & m21 & m22 \end{bmatrix}$$

$$SRC\_POINT = \begin{bmatrix} src\_x \\ src\_y \\ 1 \end{bmatrix}$$

$$DST\_POINT = \begin{bmatrix} dst\_x \\ dst\_y \\ 1 \end{bmatrix}$$

$$SRC\_POINT = SRC\_POINT + S2D\_OFFS\_PRE$$

$$DST\_POINT = \frac{S2D\_MTX \cdot SRC\_POINT}{m20*src\_x + m21*src\_y + m22}$$

$$DST\_POINT = DST\_POINT + S2D\_OFFS\_PST$$

Note that in these equations, coefficients s2d_offs_x_pre, s2d_offs_y_pre, s2d_offs_x_pst, s2d_offs_y_pst, and m00 to m22 are deformation parameters. These deformation parameters are obtained from the relationship in the coordinates between the src image and the dst image. A method of calculating m00 to m22 is known, and a description thereof will be omitted. The parameters s2d_offs_x_pre and s2d_offs_y_pre are offsets added before deformation. These coefficients are used to deform the input rectangle image with an offset. The parameters s2d_offs_x_pst and s2d_offs_y_pst are offsets added after deformation. These deformation parameters are used to deform the output image with an offset. These coefficients are used to move the deformed shape in a plane. However, since this is not necessary in this embodiment, the description will be done assuming that all the coefficients are 0.

In step S603, the difference (post-deformation offset) diff_x between the center coordinates obtained in step S601 and the coordinates obtained in step S602 is obtained by diff_*x*=rounddown(*src_x*−*dst_x*)

More specifically, after dst_x of DST_POINT is obtained, the post-deformation offset: diff_x is obtained using this equation. In this case, rounddown( ) is a function of discarding a fractional portion and returning an integer.

The post-deformation offset: diff_x obtained here is an offset amount used to move the deformed shape to the center of the output image. When this offset is applied to the deformed image 301, the deformed image 301 moves by an offset amount 310 and changes to a deformed image 302, and the center point 308 also moves by the offset amount 310 and changes to a center point 309, as shown in FIG. 3. With this processing, the coordinates (projection center coordinates) of the center point 309 of the output image match the coordinates of the center point 307 of the input rectangle image 300.

Figure 7:
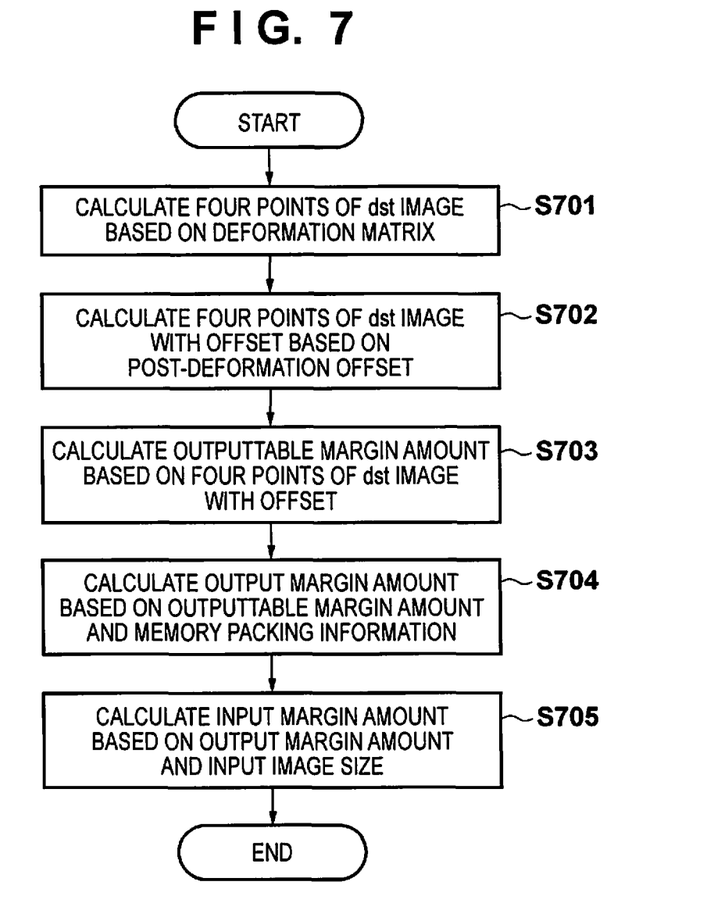
FIG. 7 is a flowchart of processing performed by an input image size calculation unit 404.

Processing performed by the input image size calculation unit 404 will be described next with reference to FIG. 7 showing the flowchart of the processing.

In step S701, the coordinates of the vertices of the dst image that is the deformed image of the src image are obtained. In FIG. 3, when the coordinates SRC_POINT0 to SRC_POINT3 of the four vertices of the input rectangle image 300 are defined in the following way, the DST_POINT0 to DST_POINT3 of the vertices of the deformed image 301 can be calculated by $$SRC\_POINT0 \sim 3 = \begin{bmatrix} src\_x0 \sim 3 \\ src\_y0 \sim 3 \\ 1 \end{bmatrix}$$

$$DST\_POINT0 \sim 3 = \begin{bmatrix} dst\_x0 \sim 3 \\ dst\_y0 \sim 3 \\ 1 \end{bmatrix}$$

$$DST\_POINT0 \sim 3 = \frac{S2D\_MTX \cdot SRC\_POINT0 \sim 3}{m20*src\_x0 \sim 3 + m21*src\_y0 \sim 3 + m22}$$

In step S702, the above-described offset is added to the DST_POINT0 to DST_POINT3 of the vertices of the deformed image 301 obtained in step S701, thereby obtaining coordinates dst_x0 to dst_x3 by dst_*x*0 to dst_*x*3=dst_*x*0 to dst_*x*3+diff_*x*

In this processing, coordinates to which the coordinates of the four corners of the input rectangle image are projected when the input rectangle image is deformed using the deformation parameters are obtained, and coordinates obtained by adding the above-described offset to the resultant coordinates are obtained as the projection four-corner coordinates.

In step S703, the outputtable margin amount is calculated using dst_x0 to dst_x3 obtained in step S702. More specifically, the margin amount is obtained by ot_*x*_margin0=(in_*w*_all/2−1)−*dst_x*0 ot_*x*_margin1=*dst_x*1−(in_*w*_all/2+1)

ot_*x*_margin2=*dst_x*2−(in_*w*_all/2+1)

ot_*x*_margin3=(in_*w*_all/2−1)−*dst_x*3 min_of_*x*_margin=MIN(ot_*x*_margin0,ot_*x*_margin1,ot_*x*_margin2,ot_*x*_margin3)

Portions indicated by ot_x_margin0 to ot_x_margin3 are shown by 303 in FIG. 3. In the equation, MIN( ) is a function of returning a minimum value.

In this processing, the distances along one border (the border along the x-axis in this case) of the input rectangle image between the projection center coordinates and the projection four-corner coordinates of the four corners are obtained, and the minimum distance out of the resultant distances is obtained.

In step S704, the output margin o_x_margin is calculated using the outputtable margin amount min_ot_x_margin, the output margin amount req_ot_x_margin necessary at the subsequent stage, and memory packing information.

Note that the memory packing information is used when arranging pixel data on a frame memory such as a DRAM. In the following equation, 8 pixels are arranged on 32 bytes. More specifically, the output margin amount ot_x_margin that is minimum and satisfies min_*ot_x*_margin≤*ot_x*_margin≤req_*ot_x*_margin
(*ot_w*_all/2)−*ot_x*_margin−1=8×*N*(*N* is a natural number)

is obtained.

In step S705, the input margin amount in_x_margin is calculated using the output margin amount ot_x_margin and the horizontal size in_w_all of the input rectangle image.

The outline of this processing will be described. An equation to convert the coordinates (src_x0 to src_x3, src_y0 to src_y3) of points 321 to 324 of an input rectangle image 306 to the coordinates (dst_x0 to dst_x3, dst_y0 to dst_y3) of points 317 to 320 of a deformed image 305 is created. The points 321 to 324 correspond to the points 317 to 320, respectively, and are used to calculate the input margin amount in_x_margin. An equation representing that dst_x0 to dst_x3 represented by the equation equal the four points of the points 317 to 320 of the deformed image 305 is solved for src_x0 to src_x3, thereby calculating in_x_margin( ) to in_x_margin3. More specifically, variables are obtained first in the following way.

$$src\_x0\_margin=(in\_w\_all/2)-ot\_x\_margin$$

$$src\_x1\_margin=((in\_w\_all/2)-1)+ot\_x\_margin$$

$$src\_x2\_margin=((in\_w\_all/2)-1)+ot\_x\_margin$$

$$src\_x3\_margin=(in\_w\_all/2)-ot\_x\_margin$$

$$src\_y0=0$$

$$src\_y1=0$$

$$src\_y2=in\_h\_all-1$$

$$src\_y3=in\_h\_all-1$$

Next, src_x[0 to 3] is calculated by $$src\_x[0\text{ to }3]=-((m21*src\_x[0\text{ to }3]\_margin-m21*s2d\_offs\_x\_pst-\text{diff}\_x*m21-m01)*src\_y[0\text{ to }3]+(m21*s2d\_offs\_y\_pre+m20*s2d\_offs\_x\_pre+m22)*src\_x[0\text{ to }3]\_margin+(-m21*s2d\_offs\_x\_pst-\text{diff}\_x*m21-m01)*s2d\_offs\_y\_pre+(-m20*s2d\_offs\_x\_pre-m22)*s2d\_offs\_x\_pst+(-\text{diff}\_x*m20-m00)*s2d\_offs\_x\_pre-\text{diff}\_x*m22-m02)/(m20*src\_x[0\text{ to }3]\_margin-m20*s2d\_offs\_x\_pst-\text{diff}\_x*m20-m00)$$

In this processing, the horizontal-direction distances between the projection center coordinates and the projection four-corner coordinates of the four corners are obtained, and a distance shorter than the minimum distance out of the resultant distances is decided as the output margin distance. The coordinates of the projection source projected to the coordinates apart from the projection center coordinates by the output margin distance in the horizontal direction are obtained as the projection source coordinates.

In FIG. 3, the coordinates of the points 321 to 324 of the projection source projected to the coordinates of the points 317 to 320 at the positions apart from the center point of the deformed image 305 in the horizontal direction by the output margin distances represented by 315 and 316 are obtained as the projection source coordinates.

Next, in_x_margin[0 to 3] is calculated by $$in\_x\_margin0=1+(in\_w\_all/2)-\text{FLOOR}(src\_x0)$$

$$in\_x\_margin1=1-(in\_w\_all/2-1)+\text{CEILING}(src\_x1)$$

$$in\_x\_margin2=1-(in\_w\_all/2-1)+\text{CEILING}(src\_x2)$$

$$in\_x\_margin3=1+(in\_w\_all/2)-\text{FLOOR}(src\_x3)$$

where FLOOR( ) is a function of discarding a fractional portion and returning an integer, and CEILING( ) is a function of rounding up a fractional portion and returning an integer.

The input margin in_x_margin is obtained by calculating $$in\_x\_margin=\text{MAX}(in\_x\_margin0,in\_x\_margin1,in\_x\_margin2,in\_x\_margin3)$$

When the input margin in_x_margin is decided, the horizontal size of the divided images to be input to the image deformation units 406 and 407 is decided as $$(in\_w\_all/2)+in\_x\_margin$$

In this processing, the horizontal distances between the projection source coordinates and the projection center coordinates are obtained, and the maximum distance out of the resultant distances is decided as the input margin distance. A result obtained by adding the input margin distance to ½ of the horizontal size of the input rectangle image is obtained as the divided image horizontal size.

An image in a region having the coordinates (0, 0) at the upper left corner and coordinates ((in_w_all/2)+in_x_margin−1, in_h_all−1) at the lower right corner in the input rectangle image is input to the image deformation unit 406. An image in a region having the coordinates ((in_w_all/2)−in_x_margin, 0) at the upper left corner and coordinates (in_w_all−1, in_h_all−1) at the lower right corner in the input rectangle image is input to the image deformation unit 407.

That is, an image in a region whose distance from the left border of the input rectangle image is equal to or less than the divided image horizontal size and an image in a region whose distance from the right border of the input rectangle image is equal to or less than the divided image horizontal size are output after having undergone deformation.

Figure 5:
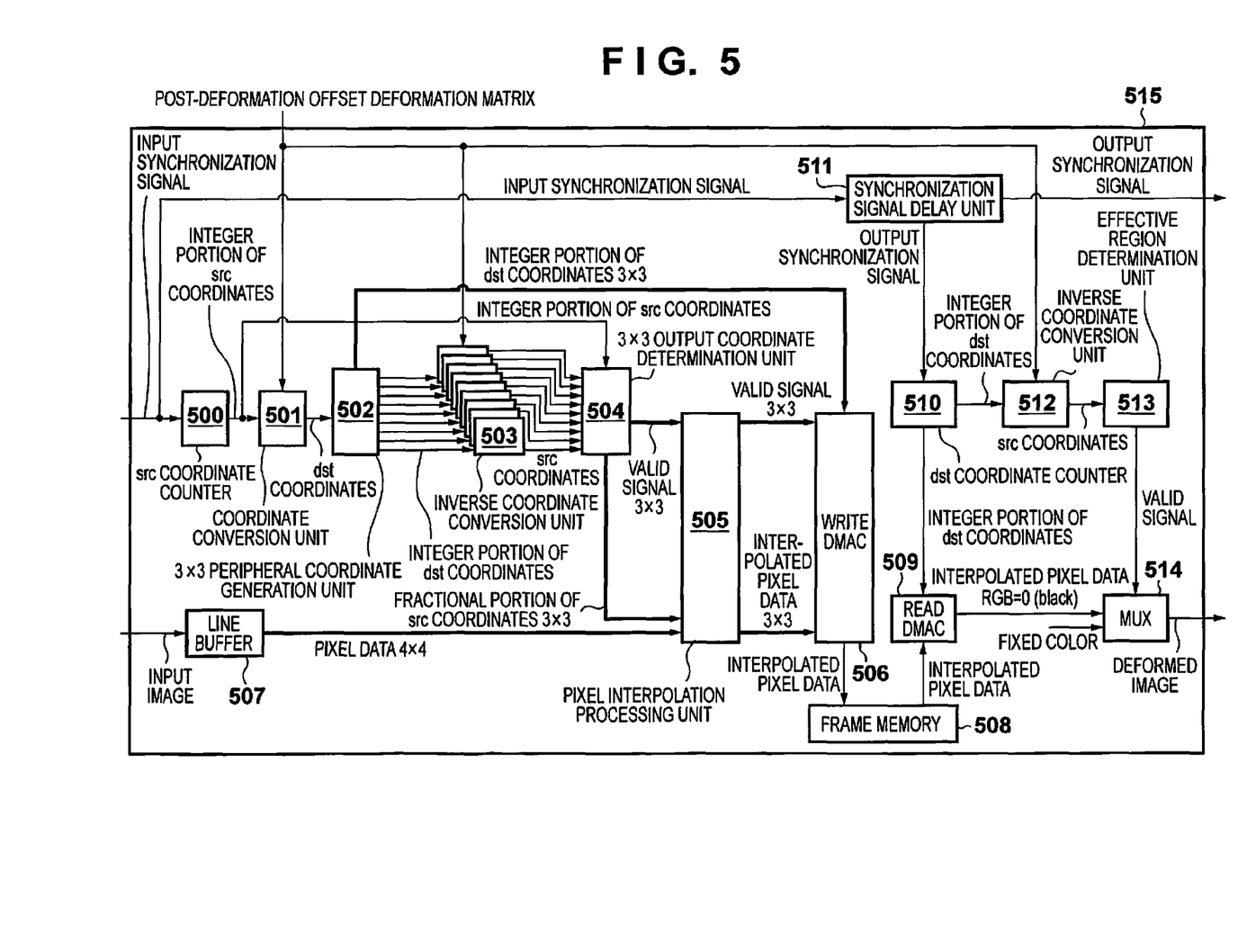
FIG. 5 is a block diagram showing an example of the functional arrangement of an image deformation unit 406 and an image deformation unit 407.

An example of the functional arrangement of the image deformation units 406 and 407 will be described next with reference to the block diagram of FIG. 5. The image deformation units 406 and 407 have the same arrangement. Hence, FIG. 5 illustrates the image deformation units 406 and 407 as an image deformation unit 515.

The image deformation unit 515 performs deformation processing for an input synchronization signal and an input rectangle image based on a post-deformation offset and deformation parameters, and outputs an output synchronization signal and a deformed image. This embodiment employs, for the image deformation, an arrangement for performing random access at the preceding stage of the frame memory and sequential access at the subsequent stage. Note that coordinates in an src image before deformation will be referred to as src coordinates, and coordinates in a dst image will be referred to as dst coordinates hereinafter.

The input synchronization signal is input to an src coordinate counter 500. The internal counter counts the coordinates and outputs the integer portion of the src coordinates. A coordinate conversion unit 501 converts the integer portion of the src coordinates into dst coordinates and inputs them to a 3×3 peripheral coordinate generation unit 502.

Processing performed by the coordinate conversion unit 501 will be described in more detail. The coordinates DST_POINT of the output image corresponding to the coordinates SRC_POINT of the input rectangle image are calculated based on the deformation parameters and the post-deformation offset diff_x calculated by the above-described processing. This processing is represented by $$\text{S2D\_OFFS\_PRE}=\begin{bmatrix}s2d\_offs\_x\_pre\\s2d\_offs\_y\_pre\\0\end{bmatrix}$$

$$\text{S2D\_OFFS\_PST}=\begin{bmatrix}s2d\_offs\_x\_pst+\text{diff}\_x\\s2d\_offs\_y\_pst\\0\end{bmatrix}$$

$$\text{S2D\_MTX}=\begin{bmatrix}m00&m01&m02\\m10&m11&m12\\m20&m21&m22\end{bmatrix}$$

$$\text{SRC\_POINT}=\begin{bmatrix}src\_x\\src\_y\\1\end{bmatrix}$$

-continued $$DST\_POINT = \begin{bmatrix} dst\_x \\ dst\_y \\ 1 \end{bmatrix}$$

$$SRC\_POINT = SRC\_POINT + S2D\_OFFS\_PRE$$

$$DST\_POINT = \frac{S2D\_MTX \cdot SRC\_POINT}{m20 * src\_x + m21 * src\_y + m22}$$

$$DST\_POINT = DST\_POINT + S2D\_OFFS\_PST$$

With this processing, the deformation processing is performed based on the post-deformation offset and the deformation parameters.

The 3×3 peripheral coordinate generation unit 502 generates the dst coordinates of 3×3 peripheral pixels about the input dst coordinates and outputs the generated dst coordinates. Nine inverse coordinate conversion units 503 are arranged to inversely convert the dst coordinates integer portions and output nine src coordinate values.

The src coordinates are input to a 3×3 output coordinate determination unit 504 and compared with the integer portion of the src coordinates input from the src coordinate counter 500. The 3×3 output coordinate determination unit 504 outputs valid signals for the 3×3 pixels and the fractional portions of the src coordinates for the 3×3 pixels.

On the other hand, the input rectangle image input to the image deformation unit 515 is temporarily held by a line buffer 507. After that, pixel data of 4×4=16 pixels are output. In this embodiment, since the pixel interpolation method is assumed to be the bicubic method, the pixel data of 4×4 pixels are output. However, when a different interpolation method is used, the reference range need not always include 4×4 pixels.

A pixel interpolation processing unit 505 receives the valid signals of the 3×3 pixels, the src coordinate integer portions of the 3×3 pixels, and the pixel data of the 4×4 pixels, and outputs the valid signals of the 3×3 pixels and interpolated pixel data of the 3×3 pixels. As the valid signals of the 3×3 pixels, the input signals are directly output. As the interpolated pixel data of the 3×3 pixels, data of the 3×3 pixels interpolated by the bicubic interpolation method while referring to the input pixel data of the 4×4 pixels are output.

In a write DMAC 506, out of the interpolated pixel data of the 3×3 pixels, only data whose valid signals of the 3×3 pixels are effective are written at the addresses designated by the integer portions of the dst coordinates. The output interpolated pixel data are held by a frame memory 508.

The portion at the stage after memory read of the image deformation unit 515 in FIG. 5 will be described next. The input synchronization signal is input to a synchronization signal delay unit 511, and an output synchronization signal is generated. The subsequent stage portion of the image deformation unit 515 is driven by the output synchronization signal generated by delay.

The output synchronization signal is input to a dst coordinate counter 510, and the internal counter generates and outputs the integer portion of the dst coordinates. A read DMAC 509 acquires, from the frame memory 508, the interpolated pixel data at the address designated by the integer portion of the dst coordinates.

An inverse coordinate conversion unit 512 receives the integer portion of the dst coordinates and generates src coordinates. The src coordinates are input to an effective region determination unit 513. The effective region determination unit 513 determines whether the src coordinates exist in an effective region or an ineffective region and outputs a valid signal. If the src coordinates falls outside the region of the input rectangle image (a negative region or a region having beyond in_w_all and in_h_all in the positive direction), there are no src coordinates corresponding to the dst coordinates generated by the dst coordinate counter 510, and 0 is output as the valid signal. In an opposite case, the src coordinates exist in an effective region, and 1 is output as the valid signal.

Finally, an MUX 514 selects the input interpolated pixel data and a fixed color based on the valid signal and outputs the data as a deformed image. In the example of the projector, the fixed color is of the region outside the trapezoid, and black is generally output.

Figure 2:
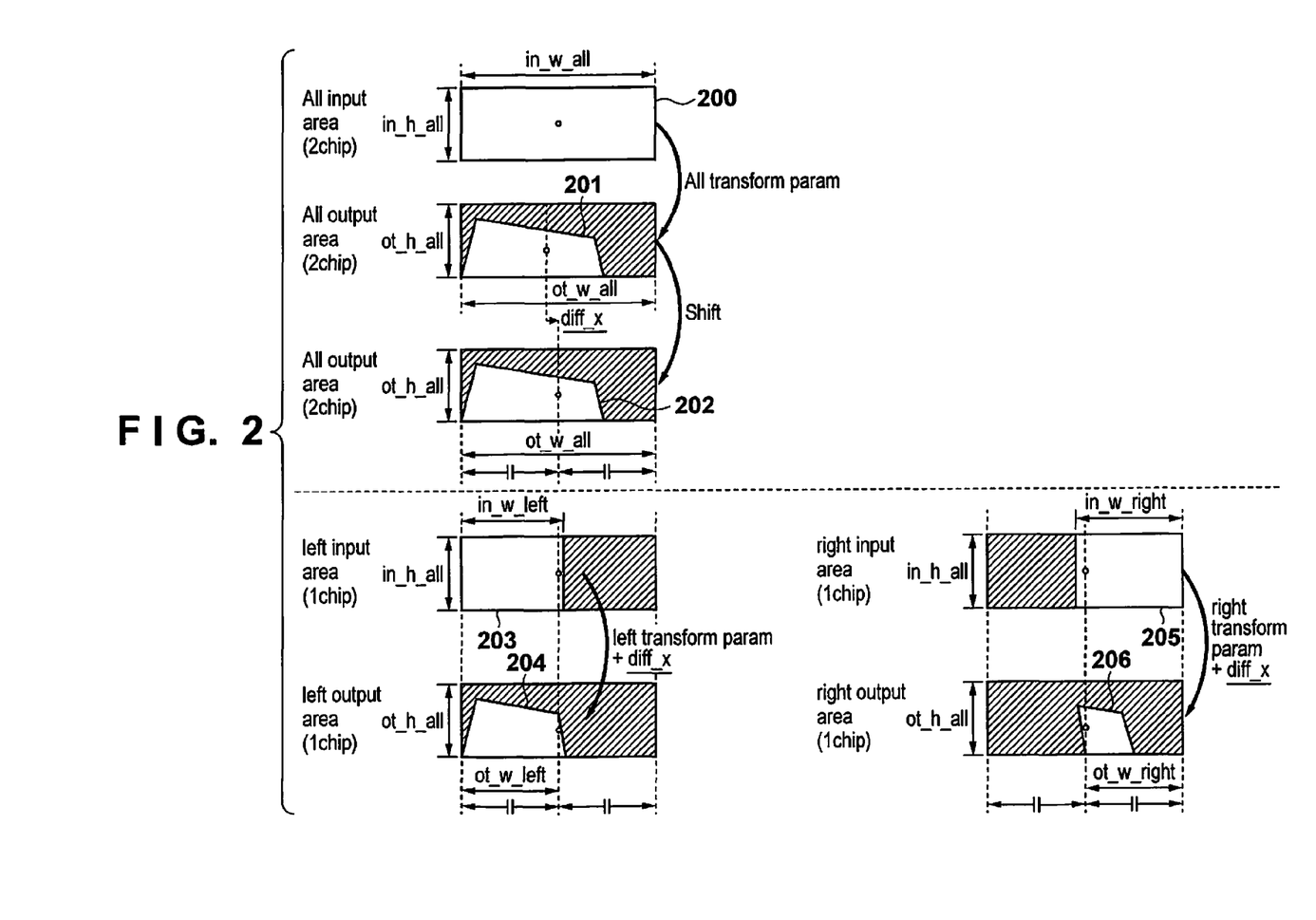
FIG. 2 is a view for explaining the effect of an embodiment.

The effect of the above-described processing will be described next with reference to FIG. 2. FIG. 2 shows an example of image deformation according to the embodiment in correspondence with FIG. 1. As can be seen from the horizontal input sizes (in_w_left, in_w_right) of the divided images shown in FIGS. 1 and 2, the horizontal input sizes are averaged by the arrangement of this embodiment. More specifically, as the images to be input to the left and right sides, respectively, in FIG. 2, the left-side input image is an image 203, and the right-side input image is an image 205, and their horizontal sizes are averaged as compared to the left-side rectangle area 102 and a right-side rectangle area 104 in FIG. 1. This allows to reduce the unevenness of the effective region in a left-side output image 204 and a right-side output image 206. It is consequently possible to support a wider degree of deformation by the same hardware resource.

Note that in the above-described arrangement, the input rectangle image is divided into two, left and right images. However, the division method is not limited to this. The input rectangle image may be divided into two, upper and lower images, or 2×2 images by combining the two methods.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-094178, filed Apr. 17, 2012, which is hereby incorporated by reference herein in its entirety.

What is claimed is:

1. An image processing apparatus comprising:
a processor; and
a memory storing instructions which, when executed by the processor, cause the image processing apparatus to:
obtain center coordinates of an input rectangle image;
obtain projection coordinates to which the center coordinates are projected when the input rectangle image is deformed using a deformation parameter necessary for deforming a shape of the input rectangle image;

obtain a distance between the projection coordinates and the center coordinates in a horizontal direction;

obtain, as projection center coordinates, coordinates calculated by adding the obtained distance to the projection coordinates, the horizontal direction being set along one border of the input rectangle image;

obtain coordinates to which coordinates of four corners of the input rectangle image are projected when the input rectangle image is deformed using the deformation parameter;

obtain, as projection four-corner coordinates, coordinates calculated by adding the distance to the obtained coordinates;

obtain distances between the projection four-corner coordinates of the four corners and the projection center coordinates in the horizontal direction;

decide, as an output margin distance, a distance shorter than a minimum distance out of the obtained distances;

obtain, as projection source coordinates, coordinates of a projection source to be projected to coordinates apart from the projection center coordinates by the output margin distance in the horizontal direction when the input rectangle image is deformed using the deformation parameter;

obtain distances between the respective projection source coordinates and the projection center coordinates in the horizontal direction;

decide a maximum distance out of the obtained distances as an input margin distance;

obtain, as a divided image horizontal size, a result obtained by adding the input margin distance to ½ of a size of the input rectangle image in the horizontal direction; and deform a shape of an image in a region whose distance from a left border of the input rectangle image is not more than the divided image horizontal size and a shape of an image in a region whose distance from a right border of the input rectangle image is not more than the divided image horizontal size to output the deformed images.

2. The apparatus according to claim 1, wherein the images whose shapes have been deformed are combined into a combined image and the combined image is output as an output image.

3. The apparatus according to claim 2, wherein the output image is output to a projector.

4. An image processing method performed by an image processing apparatus, comprising:

obtaining center coordinates of an input rectangle image;

obtaining projection coordinates to which the center coordinates are projected when the input rectangle image is deformed using a deformation parameter necessary for deforming a shape of the input rectangle image;

obtaining a distance between the projection coordinates and the center coordinates in a horizontal direction;

obtaining, as projection center coordinates, coordinates calculated by adding the obtained distance to the projection coordinates, the horizontal direction being set along one border of the input rectangle image;

obtaining coordinates to which coordinates of four corners of the input rectangle image are projected when the input rectangle image is deformed using the deformation parameter;

obtaining, as projection four-corner coordinates, coordinates calculated by adding the distance to the obtained coordinates;

obtaining distances between the projection four-corner coordinates of the four corners and the projection center coordinates in the horizontal direction;

deciding, as an output margin distance, a distance shorter than a minimum distance out of the obtained distances;

obtaining, as projection source coordinates, coordinates of a projection source to be projected to coordinates apart from the projection center coordinates by the output margin distance in the horizontal direction when the input rectangle image is deformed using the deformation parameter;

obtaining distances between the respective projection source coordinates and the projection center coordinates in the horizontal direction;

deciding a maximum distance out of the obtained distances as an input margin distance;

obtaining, as a divided image horizontal size, a result obtained by adding the input margin distance to ½ of a size of the input rectangle image in the horizontal direction; and deforming a shape of an image in a region whose distance from a left border of the input rectangle image is not more than the divided image horizontal size and a shape of an image in a region whose distance from a right border of the input rectangle image is not more than the divided image horizontal size to output the deformed images.

* * * * *